United States Patent [19]

Himes et al.

[11] Patent Number: 4,842,073

[45] Date of Patent: Jun. 27, 1989

[54] FLUID ADDITIVE AND METHOD FOR TREATMENT OF SUBTERRANEAN FORMATIONS

[75] Inventors: Ronald E. Himes, Rush Springs; Edward F. Vinson, Duncan, both of Okla.

[73] Assignee: Halliburton Services, Duncan, Okla.

[21] Appl. No.: 167,677

[22] Filed: Mar. 14, 1988

[51] Int. Cl.⁴ .................... E21B 43/267; C09K 17/00
[52] U.S. Cl. ................................ 166/294; 166/305.1; 166/308; 252/855.1; 405/264
[58] Field of Search ..................... 166/294, 271, 305.1, 166/307, 308; 106/900; 405/264; 252/8.551, 8.553, 8.554

[56] References Cited

U.S. PATENT DOCUMENTS

| | | | |
|---|---|---|---|
| 2,414,668 | 1/1947 | Ratcliffe | 252/8.554 |
| 2,761,835 | 9/1956 | Brown | 252/8.554 |
| 2,761,836 | 9/1956 | Brown et al. | 252/8.554 X |
| 2,761,840 | 9/1956 | Brown et al. | 252/8.554 X |
| 2,761,843 | 9/1956 | Brown . | |
| 2,841,222 | 7/1958 | Smith . | |
| 3,108,069 | 10/1963 | Monroe et al. . | |
| 3,199,591 | 8/1965 | Kepley | 252/8.551 X |
| 3,349,032 | 10/1967 | Krieg . | |
| 3,377,274 | 4/1968 | Burke et al. . | |
| 3,412,019 | 11/1968 | Hoover et al. . | |
| 3,422,890 | 1/1969 | Darley | 166/305.1 X |
| 3,500,925 | 3/1970 | Beiswanger et al. . | |
| 3,768,566 | 10/1973 | Ely et al. | 166/308 |
| 4,142,595 | 3/1979 | Anderson et al. . | |
| 4,158,521 | 6/1979 | Anderson et al. . | |
| 4,366,071 | 12/1982 | McLaughlin et al. . | |
| 4,440,649 | 4/1984 | Loftin et al. . | |
| 4,462,718 | 7/1984 | McLaughlin et al. | 166/305.1 X |
| 4,526,693 | 7/1985 | Son et al. . | |
| 4,580,633 | 4/1986 | Watkins et al. | 106/900 X |

OTHER PUBLICATIONS

"The Existence of a Critical Salt Concentration for Particle Release" by K. C. Khilar and H. S. Fogler–Journal of Colloid and Interface Science, vol. 101, No. 1, pp. 214-224, Sep. 1984.

"How to Combat Swelling Clays" by John E. Moore, The Petroleum Engineer, Mar. 1960.

Primary Examiner—George A. Suchfield
Attorney, Agent, or Firm—Robert A. Kent

[57] ABSTRACT

A formation control additive is utilized in stimulation fluids to minimize formation permeability damage as a result of formation contact by the stimulation fluid. The formation control additive can comprise N-alkypyridinium halides, N,N,N-trialkylphenylammonium halides, N,N,N-trialkylbenzylammonium halides, N,N-dialkylmorpholinium halides, alkyl quaternary ammonium salt of 2 mole oligomer of epihalohydrin wherein the alkyl radical is selected from the group of methyl, ethyl, propyl and butyl radicals and compounds of the general formula:

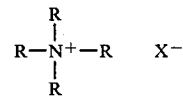

wherein R is independently a methyl, ethyl, propyl or butyl radical and X is a compatible anion.

16 Claims, 5 Drawing Sheets

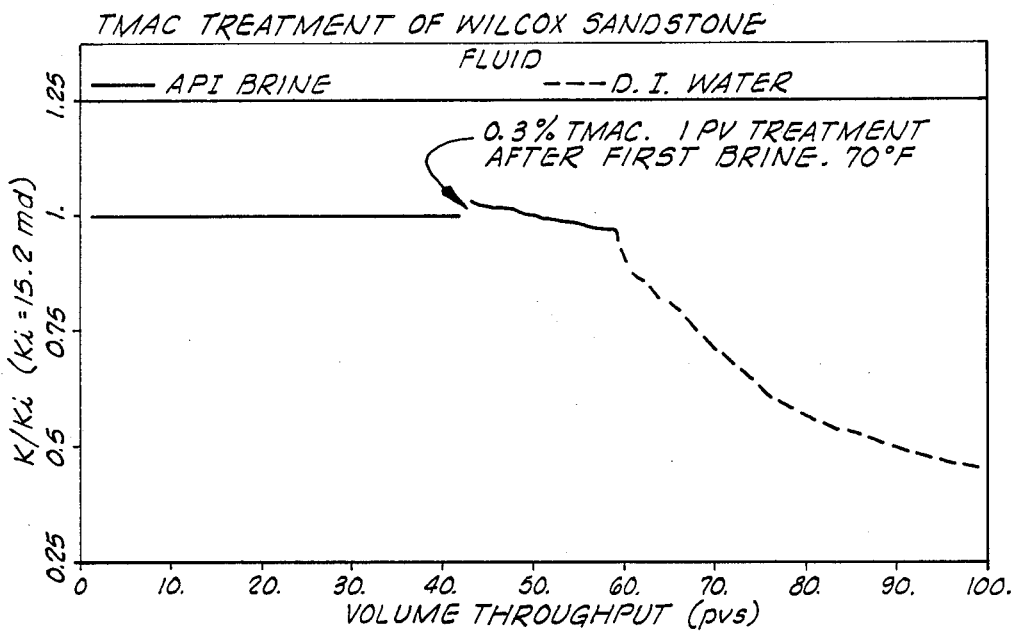
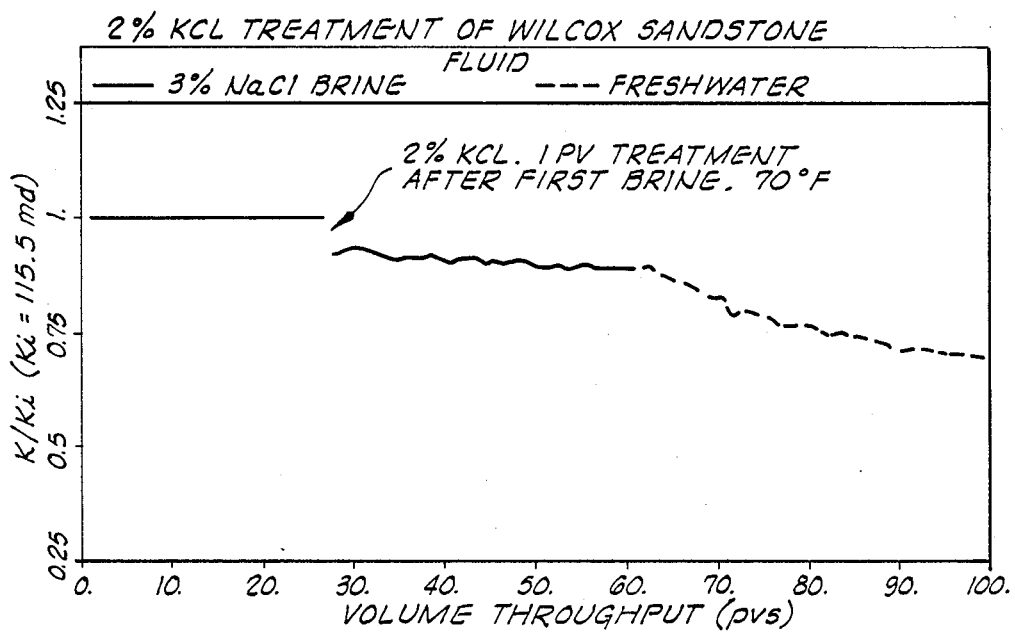
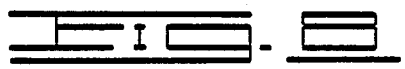

FLUID ADDITIVE AND METHOD FOR TREATMENT OF SUBTERRANEAN FORMATIONS

BACKGROUND OF THE INVENTION

1. Field of the Invention

The present invention relates to a method and fluid additive for use in treating subterranean formations containing clays and particularly for use in stimulation fluids such as fracturing fluids.

2. Prior Art

Production of oil and gas often is troubled by the presence of clays and other fines capable of migrating in the formation. Normally, the clays and fines are stable and cause no obstruction to the flow of hydrocarbons through a subterranean formation. However, when the clays or fines are disturbed, such as by contact with an aqueous fluid that is foreign to the formation, the clays can swell or the fines can migrate through the capillary flow channels in the formation resulting in a loss of a formation permeability.

There have been numerous attempts to control the ill effects of introduced aqueous fluids upon clays and other fines contained in subterranean formations. One idea has been to convert the clay from a swelling form by cation exchange to a less swelling form. This method of control is attempted through the addition of various well known salts to the aqueous fluids utilized in the treatment of subterranean formations. Salts such as potassium chloride, calcium chloride, ammonium chloride and the like typically are dissolved in the aqueous fluid utilized to effect the formation treatment. The solubilized salts effect ion exchange with the charged particles comprising the clays. While these salts often are effective at protecting a formation, they can be very detrimental to the performance of other constituents of the treatment fluid. As a result of the difficulty of dissolving the various salts in a viscosified fluid, through an inability to effect adequate mixing for the large volumes of salts required in the commercially available mixing equipment utilized in oil field services, the salts typically are admixed with the aqueous fluid before admixture of any viscosifying or gelling agents to the aqueous fluid. The salts, however, may have a detrimental effect upon the viscosity yield by the gelling agent upon hydration in the aqueous fluid.

It would be desirable to provide a method and additive by which a subterranean formation could be protected from the effects of foreign aqueous fluids and stimulation fluids could be prepared simply and without detrimental effects to fluid constituents.

SUMMARY OF THE INVENTION

The surprising discovery now has been made that a fluid additive comprising at least one member selected from the group consisting of N-alkylpyridinium halides, N,N-dialkylmorpholinium halides, tetralkylammonium halides, N,N,N-trialkylphenylammonium halides, N,N,N-trialkylbenzylammonium halides and the alkyl quaternary ammonium salt of a 2 mole oligomer of epihalohydrin, wherein the alkyl radical is selected from the group consisting of methyl, ethyl, propyl and butyl radicals, can be admixed with an aqueous fluid to be utilized in the stimulation of a subterranean formation. Alternatively, the halide anion may be replaced by any other anion which is compatible with the subterranean formation to be treated and the constituents of the stimulation fluid. The additive is admixed in an effective amount with the aqueous stimulation or treatment fluid whereby clay swelling is reduced and formation permeability is substantially maintained upon contact of the aqueous fluid with the formation.

BRIEF DESCRIPTION OF THE DRAWINGS

FIGS. 2–8 are graphical illustrations of the results of tests performed in the apparatus of FIG. 1.

DESCRIPTION OF THE PREFERRED EMBODIMENT

Figure 1:
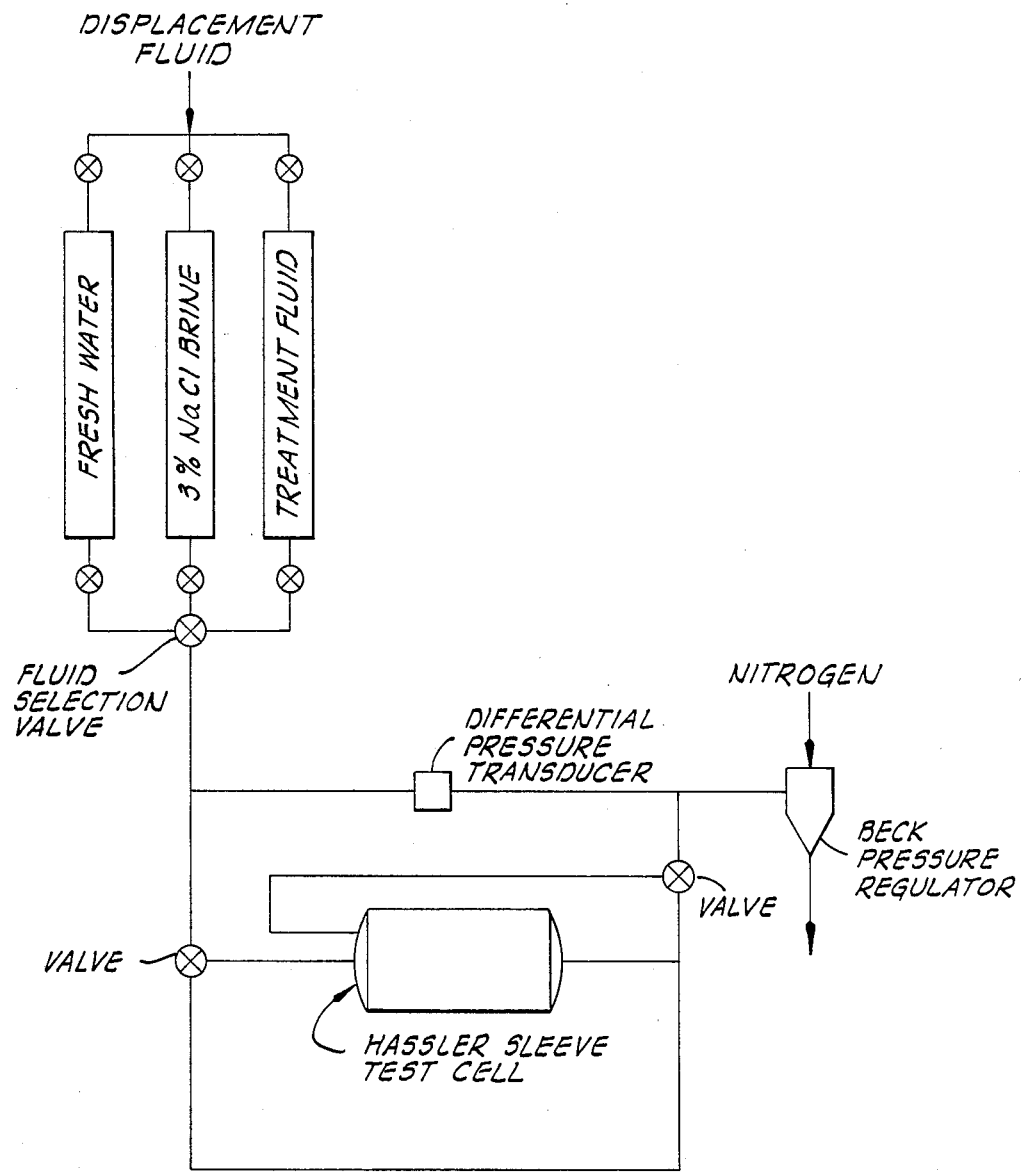
FIG. 1 is a diagrammatic schematic illustration of the test apparatus utilized in Example I.

Hydraulic fracturing has been utilized for many years to stimulate the production of oil, gas or other formation fluids from subterranean formations. In hydraulic fracturing, a suitable fluid is introduced into a subterranean formation by way of a wellbore under conditions of flow rate and pressure which are at least sufficient to create or extend a fracture into a desired portion of the formation. The fracturing fluid normally carries in it a proppant which is forced into the fracture or fractures to keep the broken formation from closing completely once the pressure is released. Various fluids have been utilized in hydraulic fracturing, however, most fluids utilized today are aqueous-based liquids.

The fracturing fluid is prepared by admixing a quantity of a polymeric gelling agent with an aqueous liquid. Generally, the gelling agent is a solvatable polysaccharide. The solvatable polysaccharides include galactomannan gums, glucomannan gums, cellulose derivatives and the like. The fracturing fluid also may include a crosslinking agent for the gelling agent as well as other additives. For example, the fluid can contain bactericides, breakers, iron control agents, foaming agents such as surfactants, gases or liquified gases, stabilizers and the like. The preparation of such fluids and the various additives are well known to individuals of ordinary skill in the art. The selection of the particular fracturing fluid constituents such as the gelling agent, crosslinking agent, breakers, stabilizers and the like is not critical to the successful operation of the present invention.

In addition to the foregoing additives, most aqueous fracturing fluids also include a formation control additive. The formation control additive generally utilized has been a solubilizable salt such as potassium chloride, ammonium chloride, sodium chloride, calcium chloride or the like. As previously indicated these salts can be difficult to admix under actual conditions of use or can have detrimental effects upon fluid properties such as reducing the viscosity achieved by a gelling agent in the aqueous fluid in comparison to hydration of the gelling-agent in fresh water. These compounds have been utilized, however, because of the ion-exchange properties of the clays present in the subterranean formations to be treated and the ability of these chemicals to provide some degree of formation stabilization through ion-exchange with the clays.

Among the clays which may be present originally in natural geological formations or which may have been introduced therein and which can be effectively treated in accordance with the present invention there are included clay minerals of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamosite; clay minerals not belonging to the above groups such as vermiculite, attapulgite, and sepiolite, and mixed-layer varieties of the above minerals and groups. The clay content of the formations can be comprised substantially of a single species of clay mineral, or of several species, including the mixed-layer types of clay. Of the clay minerals commonly encountered in natural geological formations which can be productive of the difficulties herein noted and which can be treated effectively in accordance with the present invention are clay minerals selected from the class consisting of the montmorillonite group, hydrousmica group, chlorite group, kaolin group and mixed layer types containing several of the classes. It will be understood that the clay formations treated in accordance with the invention need not be composed entirely of clay but may contain other mineral components associated therewith.

Clays can swell and/or disperse, disintegrate or otherwise become disrupted in the presence of aqueous fluids. A clay which swells is not limited to expanding lattice-type clays but includes all those clays which can increase in bulk volume with or without dispersing, disintegrating or otherwise becoming disrupted when subjected to contact with aqueous solutions such as water, certain brines, etc. Certain clays can also disperse, disintegrate or otherwise become disrupted without swelling in the presence of aqueous solutions such as water, certain brines, emulsions containing water or certain brines, and the like. Some clays in the presence of such aqueous solutions will expand and be disrupted to the extent that they will become unconsolidated and move into a borehole. Formations which consist largely of clay can develop pressures on the order of several thousand pounds per square inch upon absorbing water in a confined space.

The clay materials defined above occur as minute, plate-like, tube-like and/or fiber-like particles having an extremely large surface area compared to that of an equivalent quantity of a granular material such as sand. This combination of small size and great surface area results in a high surface energy with attendant unusual surface properties and extreme affinity for surface-active agents. The structure of some of these clays, as for instance montmorillonite, can be pictured as a stack of sheet-like three-layer lattice units which are weakly bonded to each other and which are expanded in the "c" crystallographic direction by water or other substances which can penetrate between the sheets and separate them. Montmorillonite has a cationexchange capacity of from about 90 to 130 milliequivalents per 100 grams of pure clay, illite from about 20 to 40 milliequivalents, and kaolinite from about 5 to 15 milliequivalents.

The properties of the clays vary widely with the cations occupying the base-exchange positions or sites. A "base-exchange position or site" can be defined as an area, in this instance on a clay crystal, which has associated with it an exchangeable cation. Among the cations which are generally found on the base-exchange position or site can be mentioned sodium, potassium, calcium, magnesium, iron, hydrogen, etc. These cations are believed to be held to the clay surface by ionic forces.

The cations occupying the base-exchange sites on the clay can be those originally present or cations finding their way to the base-exchange position from the liquids in contact therewith. Accordingly, the nature and concentrations of ions in the water in contact with the clay can determine the cations occupying the base exchange sites. In most oil well formations the natural waters associated therewith contain sodium as the predominant cation, with calcium, magnesium and other cations present in much smaller quantities. Since the base-exchange positions on the clay are occupied by cations, in many cases the cation will be sodium when natural ground waters such as those described above are associated therewith. Unfortunately, however, as for example in the case of the sodium form of montmorillonite, these clay minerals swell in the presence of water or certain brines and can, in some instances, exert pressures up to thousands of pounds per square inch. Thus, dependent upon the amount of water absorbed, the clay can change to a rigid paste or a gelatinous mass, or if sufficient water is present, the clay can disperse completely into the aqueous phase.

The swelling or dispersion of the clays can significantly reduce the permeability of the formation. The use of the foregoing salts as formation control additives has not eliminated formation damage as a result of permeability reduction, but merely has attempted to reduce or minimize such damage.

Surprisingly, it has been found that the use of a formation control additive comprising at least one member selected from the group of quaternary ammonium halides consisting of N-alkylpyridinium halides such as N-methylpyridinium halides, N,N-dialkylmorpholinium halides such as, N,N-dimethylmorpholinium halides, N,N,N-trialkylphenylammonium halides, such as N,N,N-trimethylphenylammonium halides, N,N,N-trialkylbenzylammonium halides such as N,N,N-trimethylbenzylammonium halides, compounds of the general formula:

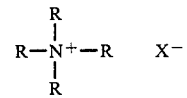

wherein R is independently $CH_3$, $C_2H_5$, $C_3H_7$ or $C_4H_9$ and $X^-$ is a halide, such as tetramethylammonium halides, tetraethylammonium halides, tetrapropylammonium halides and tetrabutylammonium halides, and the alkyl quaternary ammonium salt of a two mole oligomer of epihalohydrin, wherein the alkyl radicals are selected from methyl, ethyl, propyl and butyl radicals, in a fracturing fluid results in significantly reduced permeability damage upon contact of the fracturing fluid with the formation. The halide can comprise fluorine, chlorine, bromine or iodine. Alternatively, the halide anion may be replaced by any other anion which is compatible with the subterranean formation to be treated and the constituenst of the stimulation fluid. The anion may comprise, for example, under appropriate circumstances nitrite, nitrate or sulfate.

The quaternary ammonium halides are admixed with the aqueous fracturing fluid in an effective amount to substantially stabilize the formation against permeability damage as a result of contact with the aqueous fracturing fluid. Preferably, the formation control additive of the present invention is admixed with the aqueous fracturing fluid in an amount of at least about 0.05 percent by weight of the fracturing fluid. Most preferably, the formation control additive is present in an amount of from about 0.1 to about 5 percent by weight of the aqueous fracturing fluid.

The formation control additive can be admixed with the fracturing fluid at any time prior to contact of the fluid with the subterranean formation. In that the formation control additives are readily available as liquid solutions, they readily admix with the constituents of the aqueous fracturing fluid both prior to and subsequent to hydration of the gelling agent. The use of the present formation control additives is particularly advantageous in stimulation treatments performed with liquid gel concentrates such as for example those described in U.S. Pat. Nos. 4,312,675; 4,435,217; 3,894,880; 3,894,879; and 4,466,890, the disclosures of which are incorporated herein by reference. The formation control additive is effective in treating a subterranean formation when transported in a carrier fluid such as a fracturing fluid having either an acid, alkaline or neutral pH. The formation control additive carrier may have a pH in the range of from about 1 to 11 without any significant detrimental effect upon the formation control additive.

The formation control additive may be admixed with the constituents of aqueous liquid gel concentrate during its preparation whereupon it remains storage stable or admixed with the gel concentrate when the gelled fracturing fluid is prepared by introduction into a mixing vessel or blender together with the other fracturing fluid additives. The formation control additives of the present invention do not result in the mixing problems associated with previously used salts and do not appear to have any significant detrimental effect upon the hydration or ultimate yield of the gelling agent utilized to prepare the fracturing fluid.

To illustrate the effectiveness of the formation control additives at preventing substantial permeability reduction upon contact of an aqueous fluid with a formation the following examples are presented. The examples are not to be considered as limitations upon the scope of the present invention but are presented for illustration only. All quantities, proportions and percentages are by weight and all tests were performed at room temperature unless otherwise indicated.

EXAMPLE I

Quarried sandstone from the Ohio Formation or actual formation core samples were mounted in a Hassler sleeve test cell as set forth in FIG. 1. The differential pressure was measured across the Hassler sleeve by a differential pressure transducer. The transducer was connected to a computer that stored permeability and fluid volume data. The fluid source and transducer were connected to the Hassler sleeve test cell by multiple direction ball valves, which allowed fluid to flow through the core sample in either direction while maintaining proper polarity of the transducer pressure connections. The fluid output from the core sample was through a back pressure regulator loaded with 300 psi nitrogen pressure. The fluids were provided to the core sample from stainless steel vessels connected to a computer controlled multi-direction high pressure ball valve. The fluids were each filtered through a 0.5 micron filter before introduction into the test equipment. The fluids in the vessels were displaced into the test cell by pumping a light mineral oil into the top of the vessels with a constant displacement high pressure pump. The vessels were all maintained at the test pressure and were selected by activation of the appropriate ball valves. The fluids utilized in the tests comprised deionized water, a 3% sodium chloride solution and a treatment fluid comprising either 2% potassium chloride solution or the compound set forth in Table I.

TABLE I

| Chemical Compound | Abbreviation | Structure |
|---|---|---|
| Deionized Water | DI | — |
| 2% by wt Potassium Chloride Solution | KCl | — |
| Tetramethylammonium Halide | TMAC | $CH_3-\underset{\underset{CH_3}{|}}{\overset{\overset{CH_3}{|}}{N^+}}-CH_3 \quad X^-$ |
| Tetrabutylammonium Halide | TBAC | $C_4H_9-\underset{\underset{C_4H_9}{|}}{\overset{\overset{C_4H_9}{|}}{N^+}}-C_4H_9 \quad X^-$ |
| N,N,N—Trimethylphenyl-ammonium Halide | TMAI | $CH_3-\underset{\underset{C_6H_5}{|}}{\overset{\overset{CH_3}{|}}{N^+}}-CH_3 \quad X^-$ |
| N—Methylpyridinium Halide | MEPY | N-methylpyridinium $X^-$ |

TABLE I-continued

| Chemical Compound | Abbreviation | Structure |
| --- | --- | --- |
| N,N—Dimethylmorpholinium Halide | DMMI | 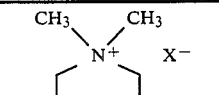 |
| Methyl Quaternary Ammonium Salt of 2 Mole Oligomer of Ephihalohydrin | EPIQ | 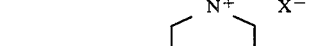 |

The initial core permeability was obtained by flowing the 3% sodium chloride through the core. The pump rate then was reduced to zero and the flow direction reversed at which time one pore volume (pv) of treatment fluid was flowed into the core. The length of the core was selected to be the average depth of invasion of fluids into a formation during a fracturing treatment. The flow rate was again reduced to zero and the direction reversed to permit flow of the 3% sodium chloride to establish a final permeability. Fresh water then was flowed through the core and the permeability of fresh water was established, if possible, to confirm that the clays were water sensitive. The before and after permeabilities to the sodium chloride solution were compared to determine treatment imposed damage. The foregoing test is believed to simulate the damage that could result from introduction of a fracturing fluid into a subterranean formation.

The results of the tests are set forth in the FIGS. 2-8 and Table II, the ratio $K/K_i$ being the ratio of the permeability after treatment to the original formation permeability prior to treatment with the formation control additive.

The results clearly illustrate the substantially non-permeability damaging nature of the fluid upon exposure of the formation core sample to the formation control agent of the present invention. In particular, FIG. 2 graphically represents the theoretical maximum damage that could be expected as a result of the introduction of one pore volume of fresh water into an Ohio sandstone core matrix. This amount is indicated by the comparison of the stabilized permeability ratio ($K/K_i$) for the 3% NaCl brine before and after the injection of the treatment. Subsequent injection of fresh water following the second brine introduction indicates the maximum amount of damage that is possible by the introduction of an excess of fresh water into the core. This also confirms that a particular core utilized is indeed fresh water sensitive.

Figure 3:
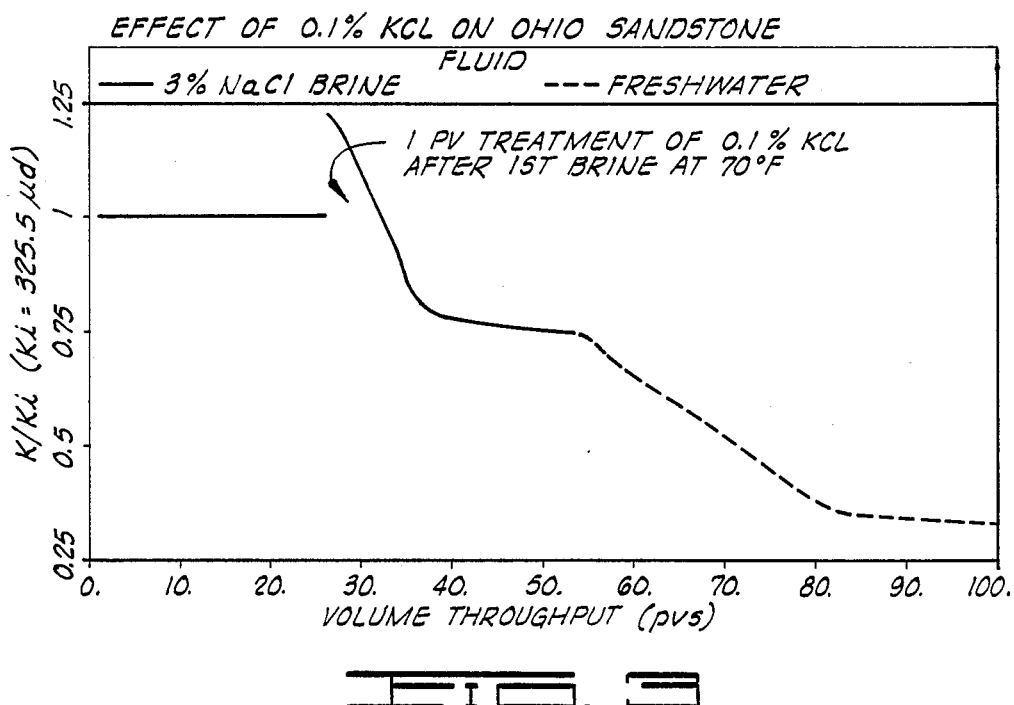
Figure 4:
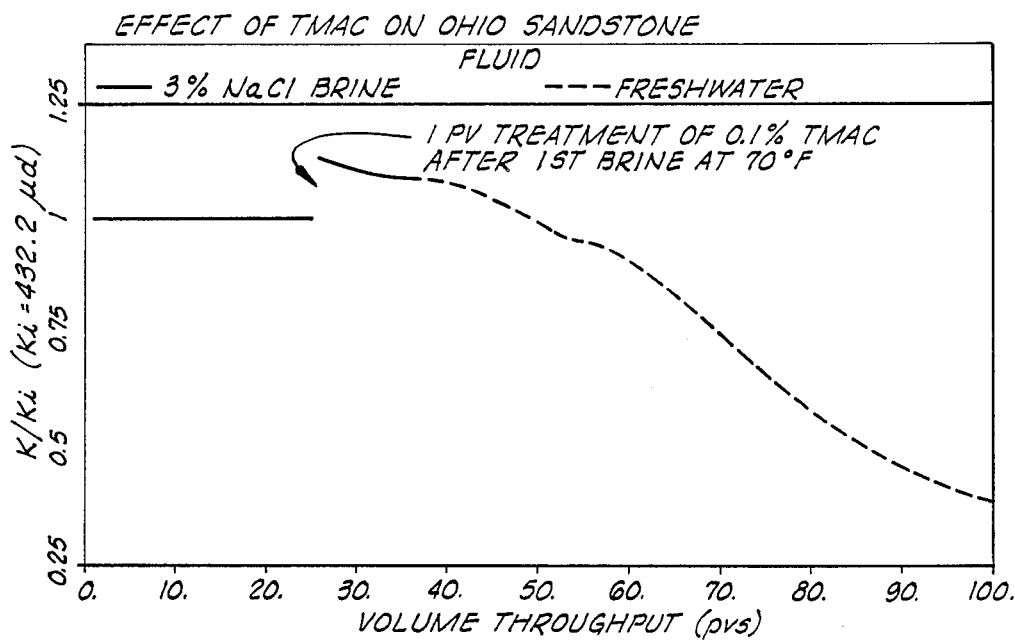

FIGS. 3 and 4 compare equal treatments of the most common clay stabilizing salt currently used (KCl) with a chemical of this invention. The results show that at equal concentrations the KCl treatment fared only slightly better than fresh water alone and yet the TMAC treatment of FIG. 4, surprisingly, showed an increase in permeability following the treatment.

Figure 2:
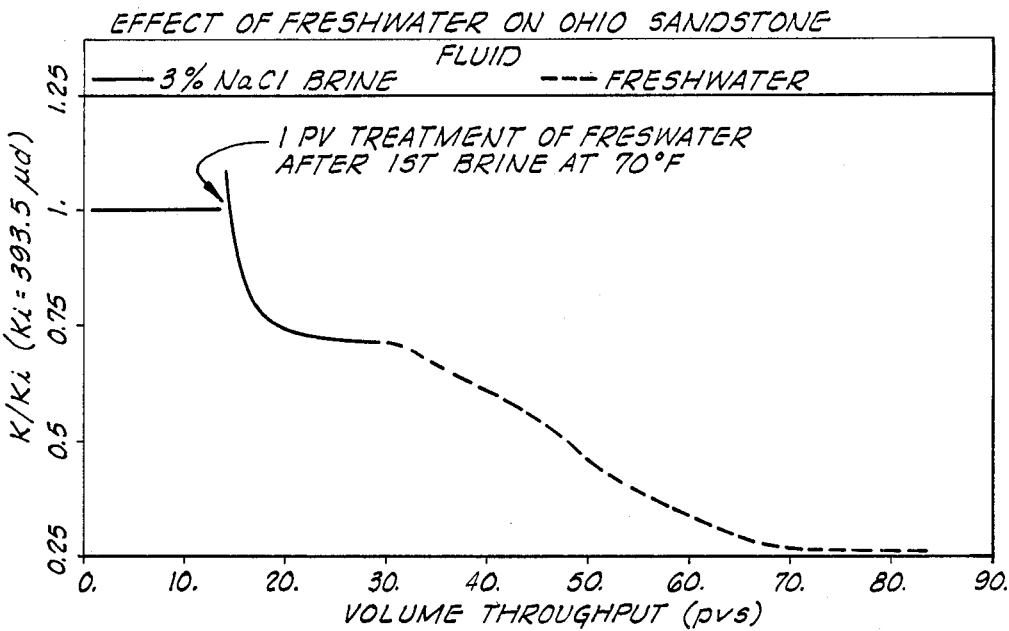
Figure 5:
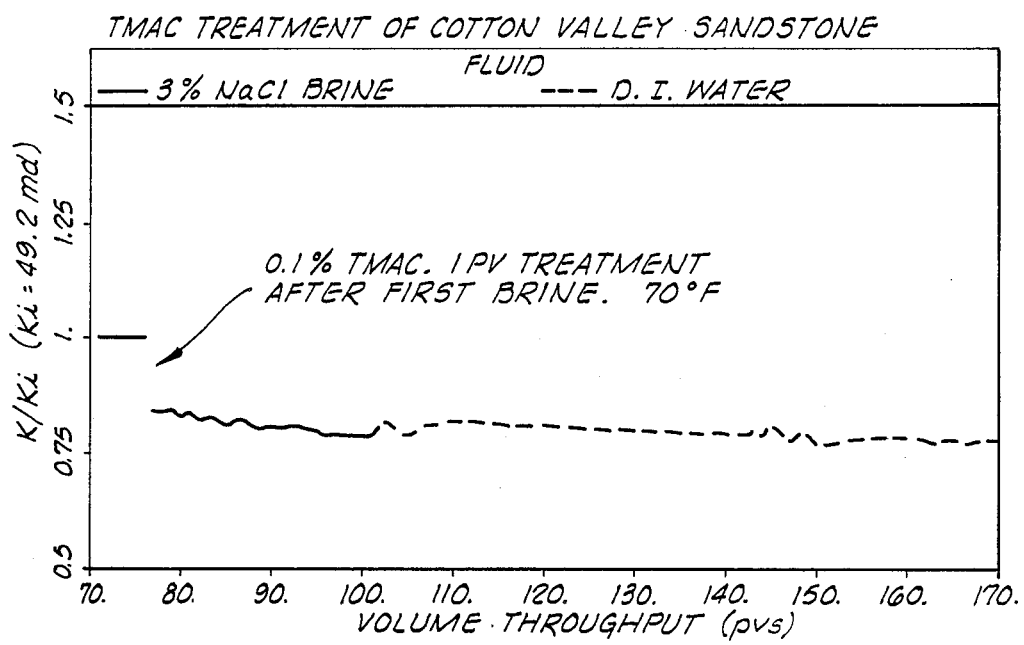
Figure 6:
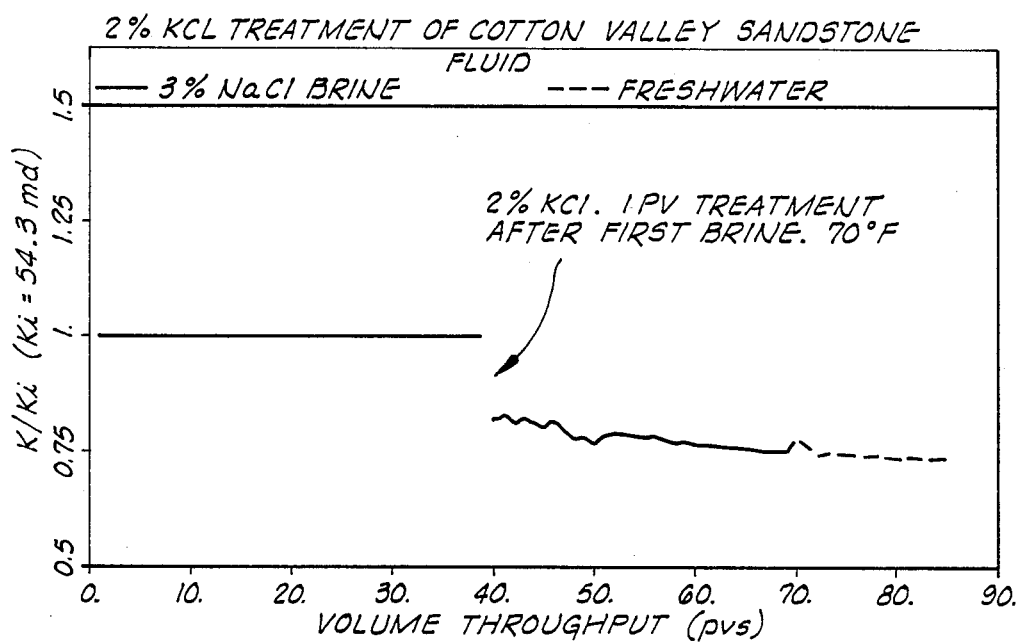

The tests illustrated in FIGS. 2-4 were performed in quarried Ohio sandstone. To exemplify the ability of this invention to stabilize clays in oil bearing sandstone, similar tests were conducted using actual formation cores from the Cotton Valley formation and the Wilcox formation. FIGS. 5 and 6 compare a treatment with a 0.1% TMAC solution with that of a 2% KCl solution (the common concentration used in fracturing). These results show that while neither provided a 100% regain in permeability, the treatment performed in accordance with the present invention resulted in a slightly higher retention of the permeability. A similar test in FIGS. 7 and 8 performed on a core from the Wilcox formation with a 0.3% TMAC solution was far superior in maintaining clay stability when compared to the 2% KCl treatment.

Table II provides an overall comparison of the results of the tests performed in Ohio sandstone cores with various additives of the present invention identified in Table I.

TABLE II

Percent Permeability Recovery After One Pore Volume Injection Of Treatment Solution

| TREATMENT SOLUTION | PERCENT PERMEABILITY RECOVERY |
| --- | --- |
| Fresh water | 72% |
| 0.1% KCl | 74% |
| 0.1% TMAC | 109% |
| 0.5% MEPY | 100% |
| 0.5% EPIQ | 94% |
| 0.5% TBAC | 93% |
| 0.5% TMAI | 80% |
| 0.5% DMMI | 96% |

While that which is considered to be the preferred embodiment of the present invention has been described herein, it is to be understood that changes and modifications can be made by one skilled in the art in the method and composition described without departing from the spirit or scope of the invention as set forth in the appended claims.

What is claimed is:

1. A method of treating a subterranean formation comprising contacting the subterranean formation with an aqueous solution of a treatment fluid containing an effective amount of a formation control additive comprising at least one member selected from the group consisting essentially of N,N,N-trialkylphenylammonium halides, N,N-dialkylmorpholinium halides, alkyl quaternary ammonium salt of 2 mole oligomer of epihalohydrin wherein the alkyl radical is selected from the group of methyl, ethyl, propyl and butyl radicals and compounds of the general formula:

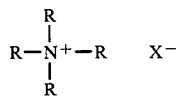

wherein at least one R is methyl and at least one of the remaining R is independently an ethyl, propyl or butyl radical and X— is any anion that does not adversely react with the formation or treatment fluid constituents whereby permeability damage resulting from contact of the aqueous treatment fluid with the formation is reduced.

2. The method of claim 1 wherein said formation control additive is present in an amount of at least about 0.05% by weight of the treatment fluid.

3. The method of claim 1 wherein said formation control additive is present in an amount of from about 0.1 to about 5% by weight of the treatment fluid.

4. The method of claim 1 wherein the treatment fluid includes a gelling agent to viscosify the treatment fluid.

5. The method of claim 1 wherein said formation control additive comprises a quaternary tetraalkylammonium halide wherein at least one alkyl is methyl and at least one alkyl group is selected from the group of ethyl, propyl and butyl.

6. The method of claim 1 wherein said formation control additive comprises at least one member selected from the group of N,N-dialkylmorpholinium halides wherein the alkyl radical is selected from methyl, ethyl, propyl and butyl.

7. The method of claim 1 wherein said formation control additive is selected from the group consisting of N,N-dialkylmorpholinium halides and is present in the treatment fluid in an amount of from about 0.1 to about 5% by weight of the treatment fluid.

8. The method of claim 1 wherein X— comprises at least one member selected from the group consisting of chlorine, fluorine, bromine, iodide, nitrite, nitrate and sulfate.

9. The method of claim 1 wherein the treatment fluid has a pH in the range of from about 1 to about 11.

10. A method of stimulating production of hydrocarbons from a clay-containing subterranean formation comprising: preparing an aqueous treatment fluid comprising an aqueous fluid, a selected gelling agent and a formation control additive consisting essentially of at least one member selected from the group comprising N,N,N-trimethylbenzylammonium halides N,N-dialkylmorpholinium halides, alkyl quaternary ammonium salt of a 2 mole oligomer of epihalohydrin wherein the alkyl radical is selected from the group of methyl, ethyl, propyl and butyl radicals and compounds of the general formula:

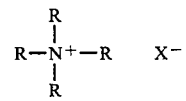

wherein at least one R is methyl and at least one of the remaining R is independently an ethyl, propyl or butyl radical and X— is any anion that does not adversely react with the subterranean formation or aqueous treatment fluid constituents and contacting said formation with said aqueous treatment fluid under conditions such that at least one fracture is caused to be created in said formation by said fluid whereby the subsequent production of hydrocarbons is facilitated, said formation control additive being present in said treatment fluid in an effective amount whereby permeability damage resulting from contact of the clays in the formation with the aqueous fluid in the treatment fluid is reduced.

11. The method of claim 10 wherein said formation control additive is present in an amount in excess of about 0.05% by weight of said aqueous treatment fluid.

12. The method of claim 10 wherein said formation control additive is present in an amount of from about 0.1 to about 5% by weight of said aqueous treatment fluid.

13. The method of claim 10 wherein said formation control additive comprises at least one member selected from the group consisting of N,N-dialkylmorpholinium halides wherein the alkyl radical is selected from methyl, ethyl, propyl and butyl.

14. The method of claim 10 wherein said formation control additive comprises at least one member selected from the group consisting of N,N-dialkylmorpholinium halides and is present in said aqueous treatment fluid in an amount of from about 0.1 to about 5% by weight of said treatment fluid.

15. The method of claim 10 wherein X— comprises at least one member selected from the group consisting of fluorine, chlorine, bromine, iodide, nitrite, nitrate and sulfate.

16. The method of claim 10 wherein said aqueous treatment fluid has a pH in the range of from about 1 to about 11.

* * * * *